INVENTOR:
FREDERICK L. RYDER
BY
Breitenfeld & Levine
ATTORNEYS

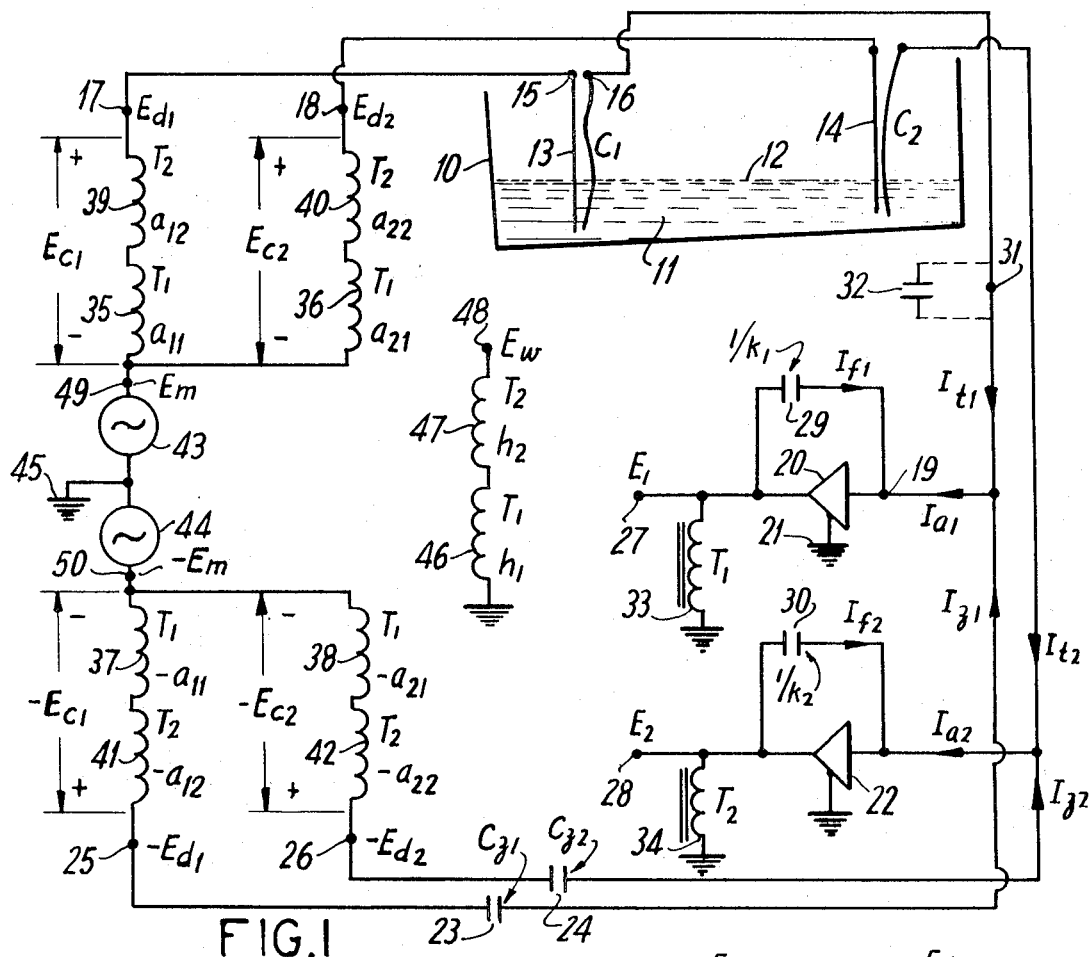

United States Patent Office 3,620,080
Patented Nov. 16, 1971

3,620,080
CAPACITANCE TYPE FLUID MEASURING
APPARATUS
Frederick L. Ryder, 50 Harrison Ave.,
Lynbrook, N.Y. 11563
Filed Jan. 15, 1970, Ser. No. 3,095
Int. Cl. G01f 23/26
U.S. Cl. 73—304 C                    15 Claims

ABSTRACT OF THE DISCLOSURE

The measuring apparatus includes at least one measuring condenser immersible in fluid in a container. An A.C. driving voltage is applied to each measuring condenser to produce a current. Circuit means produce an output voltage proportional to the excess of the measuring condenser current over the value of current which would flow through the measuring condenser, in response to the driving voltage, if the condenser were dry. The driving voltage is the sum of a fixed A.C. voltage source and a voltage proportional to the output voltage. The output voltage is therefore proportional to the weight of fluid in the container. If more than one measuring condenser is used, an individual output voltage is produced for each, and these voltages are summed to produce a single readout voltage.

---

This invention relates to capacitance type apparatus for producing a voltage proportional to the weight or mass of fluid which has dielectric properties and which is contained within a tank, without the use of a separate element for measuring the dielectric constant of the fluid.

The current state of the pertinent art may be explained with reference to U.S. Pat. No. 3,295,372, issued to A. D. Gronner. In this patent, the principal elements are a number of measuring condensers, each having two relatively long and narrow electrodes which are fixed within the tank in a direction approximately prependicular to the fluid surface. Assume $C_d$ to be the dry value of the capacitance of one of these condensers, and the variable $C_v$ to be the portion of $C_d$ that is effectively immersed when there is a variable volume V of fluid in the tank. As a result of the immersion, the dielectric constant associated with capacitance $C_v$ changes from a value of unity, for air, to a value of K, which is the dielectric constant of the fluid and is generally greater than unity. Hence the introduction of a volume V of fluid into the tank causes the capacitance to increase by the amount $(K-1)C_v$, and the total capacitance of the measuring condenser is:

$$C = C_d + (K-1)C_v \qquad (1)$$

In order to obtain fluid weight from this quantity without the aid of a separate element for measuring K, use is made of the fact that, for many dielectric fluids and for temperature ranges of practical interest, $K-1$ is some function $f$ of the density D of the fluid; that is, $$K - 1 = f(D) \qquad (2)$$

which relationship is normally significantly non-linear in D. One form of this function, described in my U.S. Pat. No. 2,981,105, is $aD^n$, where $a$ and $n$ are constants. Another form, much more widely used, is $AD/(1-BD)$, where A and B are constants.

Further, by characterizing the measuring condenser through suitable shaping and spacing of its two electrodes, the dry value of the wetted capacitance, corresponding to the fluid volume V, can be made some function $g$ of V', the latter representing the portion of V which lies within a portion of the tank which is arbitrarily assigned to the measuring condenser under consideration. Then Equations 1 and 2 give the total capacitance of the measuring capacitance as:

$$C = C_d + f(D)g(V') \qquad (3)$$

where $f(D)$ is a prescribed function, and $g(V')$ an elective function. In determining the fluid weight DV' corresponding to the volume V', Gronner adds a new, unwetted capacitance in series with C. The capacitance of the series combination is then:

$$C_sC/(C_s+C) = C_s[C_d + f(D)g(V')] / [C_s + C_d + f(D)g(V')] \qquad (4)$$

When $g(V') = 0$, corresponding to a completely dry measuring condenser, then the above quantity becomes:

$$C_sC_d/(C_s+C_d) \qquad (5)$$

and the excess $C_x$ of the previous quantity over this latter quantity turns out to be:

$$C_x = C_s^2 f(D)g(V')/(C_s+C_d)[C_s+C_d+f(D)g(V')]$$
$$= \frac{C_s^2}{(C_s+C_d)^2} \frac{f(D)g(V')}{1+f(D)g(V')/(C_s+C_d)} \qquad (6)$$

in which $C_s$ and $C_d$ are constant. Gronner effectively adjusts the elective function $g(V')$, and also selects the constant value $C_s$ of the unwetted series capacitance, so that, taking into account the prescribed non-linear function $f(D)$ and the constant dry capacitance $C_d$ of the measuring condenser, the above value of $C_x$ is proportional, within certain limits of error, to the weight DV' assigned to the measuring condenser.

$C_x$ is readily measured by applying a constant A.C. voltage to the series combination and by noting the excess of current, namely $I_x$, over the value of current that flows when the measuring capacitance is unwetted. Then, in view of the proportionality between $I_x$ and DV' for each measuring condenser, the total weight DV of fluid in the entire tank is conveniently determined as the summation, obtained by linear superposition, of the $I_x$ contributions from all measuring condensers (each with its associated series capacitance).

The resulting proportionality between the sum of the $I_x$ currents and the total fluid weight is particularly important when it is necessary to totalize the fluid weight of a plurality of tanks. As a simple example assume that there are two tanks having the respective fluid weights $(DV)_1 = W_1$ and $(DV)_2 = W_2$, the corresponding $I_x$ summations being $I_1$ and $I_2$. Because $I_1$ and $I_2$ are respectively proportional to $W_1$ and $W_2$, the desired sum $W_1 + W_2$ is readily obtained by linear superposition of $I_1$ and $I_2$. This contrasts favorably with the situation in my U.S. Pat. No. 2,981,105, where $I_1$ and $I_2$ would be respectively proportional to $W_1^{1.3}$ and $W_2^{1.3}$, so that the sum $W_1 + W_2$ would no longer be obtainable by linear superposition of $I_1$ and $I_2$.

Another advantage which Gronner achieves as a result of proportionality between current and fluid weight arises in connection with attitude changes of the tank. To appreciate this, consider a measuring condenser which lies well removed from the center of a relatively broad and shallow tank. The value of total fluid volume, say $V_0$, at which wetting of such a condenser begins, then varies considerably with attitude. Irrespective of the variation of $V_0$, however, it is desirable that the relationship between $I_x$ and DV' for this condenser remain unchanged. This requirement can ordinarily be satisfied with greater accuracy than in my aforementioned patent, where, since the current summation for the entire tank is proportional to the 1.3 power rather than to the 1.0 power of fluid weight, a larger current will be required of the measuring condenser, for attitudes in which $V_0$ is relatively large, than for attitudes in which $V_0$ is relatively small.

Nevertheless, Gronner's scheme suffers from two disadvantages. First, the junction which is common to each measuring capacitance and its associated series capacitance is essentially a high-impedance junction, since the capacitances in question are normally rather small. As a result, stray capacitance between this junction and ground must be carefully controlled, else is will modify or destroy Gronner's carefully computed circuit relationships. Second, selection of the value of series capacitance for each measuring capacitance gives only a single degree of freedom per measuring condenser, aside from the selection of $g(V')$, for achieving adequately accurate proportionality between the linear current $I_x$ and its associated portion $DV'$ of the fluid weight.

The present invention aims at eliminating the high-impedance junction, thus decreasing the undesirable sensitivity to stray capacitance. It also aims at providing a greater number of degrees of freedom for achieving the desired proportionality between the output of each measuring condenser and its associated value of $DV'$, thus decreasing the error resulting from the use of a given number of measuring condensers in a given application, or alternatively allowing the use of a lesser number of measuring condensers for a given allowable limit of error.

To achieve these novel and desirable features, I propose that each of Gronner's series capacitances be removed, and each measuring condenser be connected between the virtual ground at the input of a high-gain feedback or operational amplifier and a source of A.C voltage $E_d$, which will be called a driving voltage, and made up of the sum of several individual voltages as will be desired. For simplicity of explanation assume that there are just two measuring condensers, each having a capacitance $C$ as in Equation 3, with respective subscripts 1 and 2, to which capacitances there are applied the respective driving voltages $E_{d1}$ and $E_{d2}$, which are at the same frequency and phase though not necessarily of the same magnitude. The current through $C_1$, for example, is then proportional to $$E_{d1}C_1 = E_{d1}[C_{d1} + f(D)g_1(V'_1)] \qquad (7)$$

where it will be remembered that the subscript $d$ in $C_{d1}$ stands for "dry," and where the function $g_1$, like the value of the constant $C_{d1}$, is peculiar to measuring condenser 1. If the current proportional to $E_{d1}C_{d1}$ is diverted from the amplifier input by suitable circuitry, then the current entering said input is proportional to $$E_{d1}f(D)g_1(V'_1) \qquad (8)$$

and similarly for measuring condenser 2. It is now assumed that the output of the aforementioned high-gain feedback amplifier associated with each measuring condenser is a voltage $E$, called an output voltage, which is proportional to the amplified input current. More specifically, let $$E_1 = -k_1 E_{d1} f(D) g_1(V'_1) \qquad (9a)$$

where $k_1$ is a positive scalar constant, so that $E_1$ is at the same frequency and phase as $E_{d1}$, except for the phase reversal indicated by the minus sign. The corresponding expressing for measuring condenser 2 is:

$$E_2 = -k_2 E_{d2} f(D) g_2(V'_2) \qquad (9b)$$

Next, use is made of $E_1$ to generate two separate voltages $a_{11}E_1$ and $a_{21}E_1$, where the $a$'s are scalar constants, not necessarily positive; and similarly for $E_2$. To create the driving voltage $E_{d1}$, select from the separate voltages and connect according to the following expression:

$$E_{d1} = E_m + a_{11}E_1 + a_{12}E_2 \qquad (10a)$$

where $E_m$ is a constant A.C. voltage, called a master voltage, which is again at the same frequency and phase as $E_{d1}$. Correspondingly, $$E_{d2} = E_m + a_{21}E_1 + a_{22}E_2 \qquad (10b)$$

where $E_m$ is the same as before. On eliminating $E_{d1}$ and $E_{d2}$ from the last four equations there is obtained the following set of two equations in the two unknowns $E_1$ and $E_2$:

$$[a_{11} + 1/k_1 f(D) g_1(V'_1)] E_1 + a_{12} E_2 = -E_m$$
$$a_{21} E_1 + [a_{22} + 1/k_2 f(D) g_2(V'_2)] E_2 = -E_m \qquad (11)$$

To develop an interpretation of these equations, let it temporarily be assumed that the $a$'s with dissimilar subscripts are zero. Then for $E_1$ we have:

$$E_1 = -E_m / [a_{11} + 1/k_1 f(D) g_1(V'_1)] \qquad (12)$$

and similarly for $E_2$. For the sake of generality we momentarily ignore those subscripts which distinguish between different measuring condensers, and then rearrange the equation for comparison with Equation 6 of Gronner's circuitry, as follows:

$$E = -kE_m \frac{f(D)g(V')}{1 + akf(D)g(V')} \qquad (13)$$

Hence, if $ak$ is made numerically equal to $1/(C_s + C_d)$, then $E$ in the above equation will be proportional to $C_x$ in Equation 6, thus providing the same type of approximation to proportionality, between the effective output voltage ($E$ in the above equation) and the fluid weight $DV'$ assigned to any given measuring condenser, as is obtainable in the Gronner scheme. Also, corresponding to Gronner's linear summation of individual output currents to obtain an overall current proportional to the total fluid weight $DV$, within allowable limits of error, there can be performed a linear summation of the E-voltage to obtain an overall output voltage, $E_w$, which is similarly proportional to the total fluid weight.

Now to improve the approximation over and beyond that obtainable by Gronner, let the $a$'s with dissimilar subscripts in Equations 11 be restored, and let it be recognized that the effective outputs $E_1$ and $E_2$ are influenced by these $a$'s as well as by those with similar subscripts. Then, corresponding to Gronner's single selectable constant $C_s$ for each measuring condenser, there are in the present case two such constants. By common experience in the fitting of functions, the goodness of fit almost invariably improves as the number of selectable constants increases, thus leading to increased accuracy in the proportionality between each $E$ and its corresponding $DV'$, and consequently between the overall output voltage $E_w$ and the total fluid weight $DV$. The numerical determination of the values of these constants in actual applications is a purely mathematical matter, and is outside the scope of this invention.

The other advantage of the present invention over that of Gronner, namely the elimination of the high-impedance junctions, will become apparent in the following discussion of illustrative practical embodiments of the invention, in which reference will be made to the accompanying figures, where:

FIG. 1 shows a general arrangement and schematic circuit diagram of one embodiment of the invention, which emphasizes the use of transformers;

FIG. 2 shows how to provide the negative driving voltages, $-E_d$, from the positive driving voltages, $E_d$, in a more economical manner than in FIG. 1;

FIG. 3 shows another economical method of producing the negative driving voltages, in which the burden on the transformers is eased by independently supplying the positive and negative master voltages, $E_m$ and $-E_m$;

Figure 4:
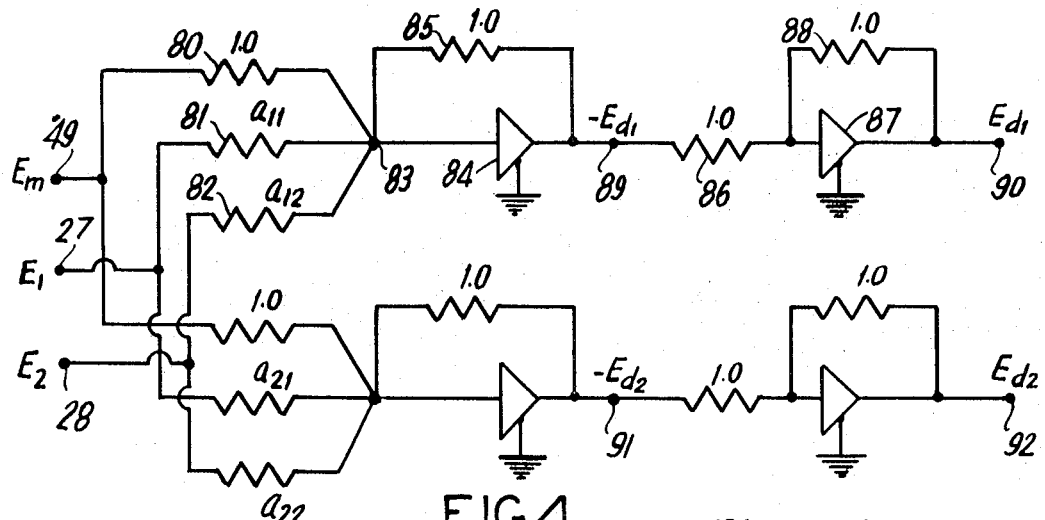
FIG. 4 shows a means of producing the positive and negative driving voltages from the output voltages $E$ and the positive master voltage $E_m$ by use of amplifiers rather than transformers.

Referring to FIG. 1, tank 10 contains a body of dielectric fluid 11 having a surface 12, in which fluid there are immersed measuring condensers 13 and 14 having the respective capacitances (in the immersed condition) $C_1$ and $C_2$. Each of said measuring condensers may consist of a plurality of two-electrode condensers connected in parallel.

Terminal 15 of measuring condenser 13 is connected to a terminal 17 whose voltage with respect to ground is the A.C. driving voltage $E_{d1}$. The other terminal 16 of the condenser is connected to input terminal 19 of high-gain amplifier 20, said amplifier being grounded as symbolized by ground-connection 21. Measuring condenser 14 is similarly connected to terminal 18, whose voltage above ground is $E_{d2}$, and to the input of amplifier 22.

On the assumption that the output voltage of each of the amplifiers is within its allowable working range, the input voltage must be virtually at ground level because of the high gain. Then, if appropriate units (dependent on the frequency) are used for the magnitude of the total current through measuring condenser 13, said magnitude may be expressed as:

$$I_{t1}=E_{d1}C_1=E_{d1}[C_{d1}+(K-1)C_{v1}] \quad (14)$$

where, following Equation 1, $C_{d1}$ is the dry capacitance of the measuring condenser; $K-1$ is the excess of the dielectric constant of the fluid over that of air; and $C_{v1}$ is the dry value of that portion of $C_{d1}$ which is wetted according to the volume $V$ of fluid in the tank. A similar equation holds for measuring condenser 14.

Replacing $K-1$ by its equivalent $f(D)$ according to Equation 2, where $D$ is the fluid density, and replacing $C_{v1}$ by the characterization function $g_1(V'_1)$ in general accordance with Equation 3, where $V'_1$ represents a portion of the total volume $V$ that is arbitrarily assigned to measuring condenser 13, it is found that, with the same units for current as before:

$$I_{t1}=E_{d1}[C_{d1}+f(D)g_1(V'_1)] \quad (15)$$

and similarly for measuring condenser 14.

Next, note the unwetted condensers 23 and 24, which are called zeroing condensers for reasons that will presently become clear, and which have the respective capacitances $C_{z1}$ and $C_{z2}$. Condenser 23 is connected between terminal 25, whose A.C. voltage above ground is the negative driving voltage $-E_{d1}$ (which has the same magnitude as $E_{d1}$ but is opposite in phase), and input terminal 19 of amplifier 20, which terminal has been shown to be at virtual ground. Hence, the magnitude of the so-called zeroing current through condenser 23 may be expressed as (in the same units as before):

$$I_{z1}=-E_{d1}C_{z1} \quad (16)$$

Further, it can be seen by inspection that this current is at the same phase as current $I_{t1}$ through measuring condenser 13 (except for a phase reversal). Then, if $C_{z1}$ has the same value as the dry capacitance $C_{d1}$ of said measuring condenser, the magnitude of the resultant current approaching input terminal 19 of amplifier 20, called the active current, may be expressed as follows by use of the latter two equations:

$$I_{a1}=I_{t1}+I_{z1}=E_{d1}f(D)g_1(V'_1) \quad (17)$$

which represents the excess of total current $I_{t1}$ over the value that flows through measuring condenser 13 when fluid volume $V$ is zero. A similar equation holds for $I_{a2}$, which is the active current for measuring condenser 14.

Next it is undertaken to express the so-called output voltages $E_1$ and $E_2$, at amplifier output terminals 27 and 28 respectively, in terms of the active currents $I_{a1}$ and $I_{a2}$. Note the feedback condensers 29 and 30, having the respective constant capacitances $1/k_1$ and $1/k_2$, through which flow the respective feedback currents $I_{f1}$ and $I_{f2}$.

Since terminal 19 is at virtual ground, and since the input impedance of amplifier 20 is very large as in conventional practice, no current flows in the line immediately to the left of the terminal, so that $I_{f1}=-I_{a1}$. This can be true only if $$E_1/k_1=I_{f1}=-I_{a1} \quad (18)$$

By inspection, $E_1$ is in phase opposition with driving voltage $E_{d1}$ (though both these voltages are removed 90° in phase from $I_{a1}$). Then, on replacing the value of $I_{a1}$ in the above equation by its value from Equation 17, it is found that the previous Equation 9a is satisfied, with $k_1$ a positive scalar as previously assumed. Similarly, it may be shown that Equation 9b is also satisfied.

At this point it is desirable to explain a fundamental difference between the present circuitry and that of Gronner. Gronner would open the line at point 31, and would place a series condenser 32 between terminal 16 of measuring condenser 13 and the virtual ground at terminal 19, as symbolized by the dotted lines leading to series condenser 32 in FIG. 1. In the present invention, on the other hand, condenser 29 is on the side of the virtual ground which is opposite to that of the measuring condenser, and is used purely for feedback purposes in order to generate a voltage $E_1$ which is proportional to the active current $I_{a1}$ according to Equation 18.

A further clarification may result from comparing the currents through Gronner's series condenser 32 and through my feedback condenser 29. The former current is the entire current through measuring condenser 13, and is therefore influenced by the value of dry capacitance $C_{d1}$. The latter current, on the other hand, is equal in magnitude to the excess of the total measuring-condenser current over the value that would flow in the absence of fluid, and is therefore independent of $C_{d1}$.

Further valuable clarification arise by the examination of certain impedance-levels. In Gronner's circuit, for example, terminal 16 is surrounded on both sides by relatively high impedances, namely the impedances of measuring condenser 13 and of series condenser 32. Hence its voltage will be readily influenced by stray capacitance between said terminal and ground, with consequent distortion of Gronner's precisely computed circuit relationships. In the present invention, on the other hand, terminal 16 is at the virtual ground of amplifier input terminal 19, so that its voltage is insensitive to said stray capacitance. Terminal 15 is not at ground potential, and might therefore be thought to be sensitive to stray capacitance; however, it is in fact insensitive because it is connected to the source of driving voltage $E_{d1}$, which source will shortly be seen to be at a low impedance-level.

Continuing the description of the circuit elements of FIG. 1, note coil 33, which is the primary of transformer $T_1$ and which is energized by the output $E_1$ of amplifier 20. This transformer has four secondaries 35, 36, 37 and 38, all identified by the designation $T_1$, with their respective turns ratios, taken with respect to the primary 33, given by the constants $a_{11}$, $a_{21}$, $-a_{11}$ and $-a_{21}$, so that the voltages across said secondaries are respectively $a_{11}E_1$ ... $-a_{21}E_1$. Similarly, coil 34 is the primary of transformer $T_2$, with the four secondaries 39, 40, 41 and 42. The total voltage across secondaries 35 and 39, called a correcting voltage for reasons that will be understood shortly, may be expressed as:

$$E_{c1}=a_{11}E_1+a_{12}E_2 \quad (19)$$

which is seen to be compatible with the designation of the negative correcting voltage, $-E_{c1}$, across secondaries 37 and 41; and similarly for the correcting voltage across secondaries 36 and 40, and across secondaries 38 and 42.

Next note A.C. voltage sources 43 and 44, arranged to give equal and opposite voltages $E_m$ and $-E_m$, called the positive and negative master voltages respectively. It may be seen that these voltages could be supplied by the center-tapped and center-grounded secondary of a transformer whose primary is energized by an A.C. supply.

On the assumption that there is negligible phase shift between primary and secondary transformer voltages (except for desirable phase reversal), and taking into account that the output voltages $E_1$ and $E_2$ have been shown to be in phase opposition with the driving voltages $E_{d1}$ and $E_{d2}$, it can be seen by inspection that all voltages in FIG. 1 are either at the same phase or in opposition with this phase. In that case the previous Equation 10$a$ is seen to represent the voltage rise from ground terminal 45 to the positive driving voltage terminal 17, with voltage $E_{c1}$ of Equation 19 constituting a correction to the master voltage $E_m$ in accordance with the output voltages $E_1$ and $E_2$; and similarly for Equation 10$b$. Then, since FIG. 1 has now been shown consistent with Equations 9$a$, 9$b$, 10$a$ and 10$b$, it follows, from the detailed discussion given above in connection with Equations 11, 12, and 13, that the scheme results in the desired proportionality between $E_1$ and the partial fluid weight $DV'_1$, assigned to measuring condenser 13, and similarly between $E_2$ and $DV'_2$.

To obtain the overall output voltage, $E_w$, by linear superposition of the separate output voltages $E_1$ and $E_2$, use may be made of additional secondaries 46 and 47 for transformers $T_1$ and $T_2$, respectievly. On assigning the respective turns ratios $h_1$ and $h_2$, there results the following voltage at overall output voltage terminals 48:

$$E_w = h_1 E_1 + h_2 E_2 \qquad (20)$$

which can be made proportional to total fluid weight $DV$, as desired, by suitable choice of said turns ratios.

Since the amplifier outputs are at a low impedance level as in conventional practices; and since transformers are readily made to be low-impedance devices; and since the sources of the master voltages $E_m$ and $-E_m$ can be made low in impedance-level, then the driving voltage terminals 17, 18, 25 and 26 are at low impedance-level, as was previously assumed and as is necessary for convenient and correct operation of the circuit.

Finally, it should be recognized that the circuit of FIG. 1 can readily be reduced to the case of a single measuring condenser, in which case only the secondaries with the turns ratios $a_{11}$ and $-a_{11}$ would remain, and $E_w$ would coincide with $E_1$. It can also be expanded to the case of more than two measuring condensers, in which case it might be convenient to make some of the turns ratios zero so that their associated secondaries could be bypassed and omitted.

FIG. 2 shows how the negative driving voltages $-E_d$ can be generated in a more economical manner than in FIG. 1, providing the positive driving voltages have already been obtained. In FIG. 2 the elements 45, 43, 35, 36, 39 and 40 are the same as in FIG. 1, resulting in the voltages $E_{d1}$ and $E_{d2}$ at terminals 17 and 18 respectively. To produce $-E_{d1}$, use is made of coil 60, which is the primary of a new transformer $T_{d1}$ and is connected between terminal 17 and ground, so that the voltage across it is $E_{d1}$. Coil 62 is a secondary of transformer $T_{d1}$ and has a turns ratio of $-1.0$ with respect to primary 60, so that the voltage across it is $-E_{d1}$. Hence, if one terminal of coil 62 is connected to ground, the other terminal 64 is at the voltage $-E_{d1}$, and can therefore replace terminal 25 in FIG. 1. Similarly, the negative driving voltage $-E_{d2}$ is produced at terminal 65 by use of primary 61 and secondary 63 of transformer $T_{d2}$, so that terminal 65 can replace terminal 26 in FIG. 1. The economy effected by this scheme becomes more important as the number of measuring condensers, and hence the number of separate driving voltages, increases.

FIG. 3 aims at the same economy of transformer coils as does FIG. 2, but avoids the need for including the negative master voltage $-E_m$ in the voltage transformations, such inclusion constituting an unnecessary burden on the transformers as well as on the amplifiers, 20 and 22 in FIG. 1, which energize the primaries 33 and 34 of transformers $T_1$ and $T_2$. In FIG. 3 the elements 45, 43, 35, 36, 39 and 40 are again the same as in FIG. 1, but element 44 is also retained, thereby yielding the negative master voltage $-E_m$ at the terminal 50, as well as the positive correcting voltages $E_{c1}$ and $E_{c2}$ between terminals 49 and 17 and between terminals 49 and 18 respectively. Primaries 70 and 71 of new transformers $T_{c1}$ and $T_{c2}$ are placed across said respective sets of terminals, and corresponding secondaries 72 and 73, each with a turns ratio of $-1.0$, are placed between terminals 50 and 74 and between 50 and 75 respectively, so that the negative driving voltages $-E_{d1}$ and $E_{d2}$ appear at terminals 74 and 75, which terminals can therefore respectively take the place of terminals 25 and 26 in FIG. 1.

FIG. 4 shows how the driving voltages can be produced from the output voltages $E_1$ and $E_2$ and from the positive master voltage $E_m$ by amplifiers rather than by transformers. The elements 27, 28 and 49 are the same as in FIG. 1. Resistors 80, 81 and 82 are conventional summing elements leading to the input terminal 83 of high-gain amplifier 84, the relative value of conductance of said elements being 1.0, $a_{11}$ and $a_{12}$, as indicated, where the $a$'s have the same significance as before. Feedback resistor 85 has a relative conductance of 1.0, so that, in view of the fact that negligible current flows in the line immediately to the right of terminal 83 because of the high input impedance of the amplifier, and taking into account the voltage indicated at terminal 89:

$$1.0\ E_m + a_{11} E_1 + a_{12} E_2 = -(-E_{d1}) \qquad (21)$$

which agrees with Equation 10$a$. The negative driving voltage $-E_{d1}$ at terminal 89 is then inverted by the conventional inverter consisting of resistors 86 and 88, with relative conductance-values of unity, and amplifier 87, producing the positive driving voltage $E_{d1}$ at terminal 90. Similarly, the driving voltages $-E_{d2}$ and $E_{d2}$ are produced at terminal 91 and 92 respectively. Hence the terminals 90, 92, 89 and 91 can replace the respective terminals 17, 18, 25 and 26 in FIG. 1.

Figure 5:
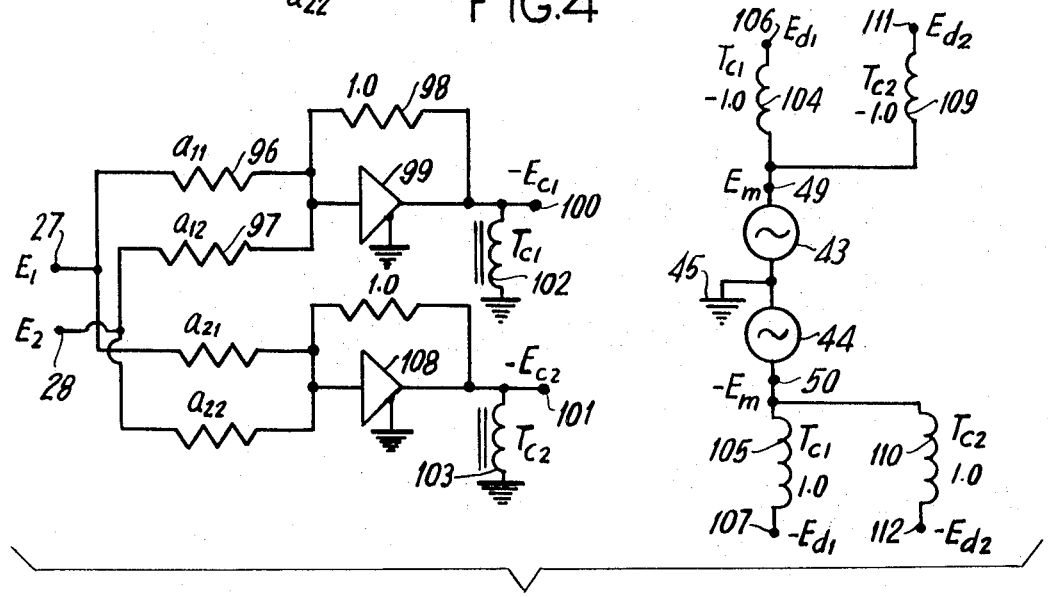
FIG. 5 shows another method of producing the driving voltages, using both amplifiers and transformers.

FIG. 5 shows how the driving voltages can be produced from the output voltages and from the positive and negative master voltages by the combined use of amplifiers and transformers. Elements 27, 28, 45, 43, 44, 49 and 50 are the same as in FIG. 1. Resistors 96, 97 and 98, of respective conductance-value $a_{11}$, $a_{12}$ and 1.0, together with amplifier 99, form a summing device which, in view of the voltage designation at terminal 100, yields:

$$a_{11} E_1 + a_{12} E_2 = -(-E_{c1}) \qquad (22)$$

which is consistent with Equation 19. The negative correcting voltage $-E_{c1}$ is applied to primary 102 of transformer $T_{c1}$. This induces across secondary 104, which has a turns ratio of $-1.0$, the positive correcting voltage $E_{c1}$, in view of which the voltage at terminal 106 is $E_m + E_{c1}$, which equals the positive driving voltage $E_{d1}$. Across secondary 105 of transformer $T_{c1}$, which has a turns ratio of 1.0 with respect to primary 102, there appears the voltage $-E_{c1}$, which when added to the voltage $-E_m$ at terminal 50 produces the negative driving voltage $-E_{d1}$ at terminal 107. Similarly, with the aid of amplifier 108 and its associated resistors, as well as of transformer $T_{c2}$ with its primary 103 and secondaries 109 and 110, there results at terminals 111 and 112 the driving voltages $E_{d2}$ and $-E_{d2}$ respectively. Hence terminals 106, 111, 107 and 112 may replace the respective terminals 17, 18, 25 and 26 in FIG. 1.

Figure 6:
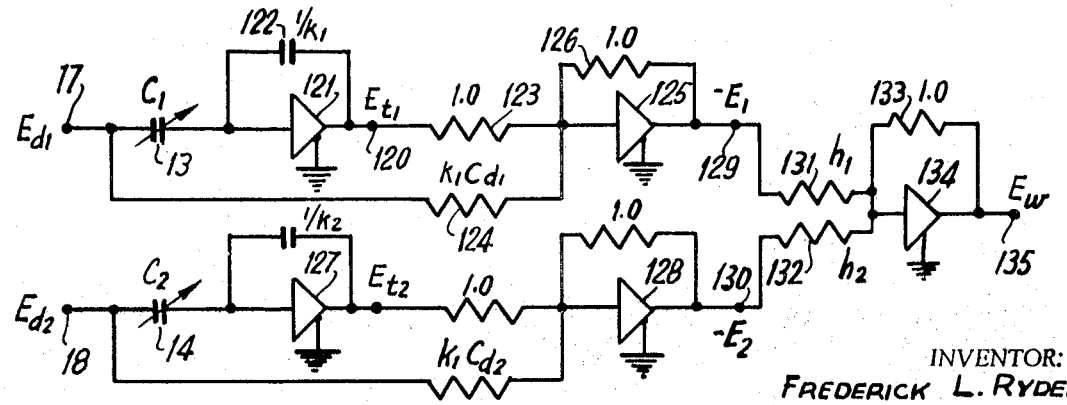
FIG. 6 shows a convenient method for producing the output voltages from the driving voltages, as well as for producing an overall output voltage $E_w$ from the individual output voltages $E$, by use of amplifiers.

FIG. 6 shows a scheme for producing the output voltages $E_1$ and $E_2$, as well as the overall output voltage $E_w$, by use of amplifiers rather than by transformers. Elements 17, 18, 13 and 14 are the same as in FIG. 1. Condenser 122 is a feedback capacitor, of relative capacitance value $1/k_1$ (where $k_1$ has the same value as before), which in conjunction with amplifier 121 produces at terminal 120 a voltage which is in phase opposition with $E_{d1}$ and of a magnitude such that:

$$-E_{t1}/k_1 = E_{d1} C_1 = E_{d1}[C_{d1} + f(D) g_1(V'_1)] \qquad (23)$$

where use has been made of Equation 7. Also, resistors 123 and 124, with relative conductance-values of 1.0 and $k_1 C_{d1}$, acts in conjunction with resistor 126, having a relative value of conductance of 1.0, and amplifier 125 to produce, at terminal 129, a voltage which is in phase with $E_{d1}$ and has a magnitude called $-E_1$ such that:

$$E_{t1} + k_1 C_{d1} E_{d1} = -(-E_1) \qquad (24)$$

On eliminating $E_{t1}$ between this equation and the preceding one, it is found that the value of $E_1$ coincides with the value given in Equation 9a. By similar use of amplifier 127 and its associated feedback capacitor, and of amplifier 128 and its associated resistors, there is produced at terminal 130 the voltage $-E_2$, where $E_2$ has the value given in Equation 9b.

The voltages at terminals 129 and 130 are actually the negatives of the respective output voltages. To use these voltages in FIG. 1, with terminals 129 and 130 respectively replacing terminals 27 and 28 in that figure, it is merely necessary to change the signs of the turns ratios in secondaries 35, 36, 39 and 40. Secondaries 37, 38, 41 and 42 are omitted, as are also the source 44 of the negative master voltage, and zeroing condensers 23 and 24. Analogous considerations hold for use of FIG. 6 in conjunction with FIG. 5, where there will be obtained $E_{c1}$ and $E_{c2}$ instead of $-E_{c1}$ and $-E_{c2}$ respectively. To use FIG. 6 in conjunction with FIG. 4, the negative master voltage is retained, and the three terminals at the left in FIG. 4 are changed to 50, 129 and 130 with the respective voltages $-E_m$, $-E_1$ and $-E_2$, in which case the voltages at terminals 89 and 91 in that figure become $E_{d1}$ and $E_{d2}$ respectively, and the elements of the figure to the right of said terminals may be omitted.

Before continuing with the description of new elements in FIG. 6, it should be pointed out that controlled variation of resistors 124 and 126 provide a particularly convenient means of respectively compensating for uncontrollable variation in the dry capacitance $C_{d1}$ of measuring condenser 13 and of trimming the scale factor associated with $-E_1$; and similarly for corresponding elements associated with measuring condenser 14.

Finally, to produce the overall output voltage $E_w$ from the separate output voltages in FIG. 6, use is made of the conventional summing device associated with amplifier 134, where summing resistors 131 and 132 have the relative values of conductance $h_1$ and $h_2$ respectively (these constants having the same significance as before), and the feedback resistor 133 has a relative conductance-value of unity. The overall output voltage then appears at terminal 135.

Numerous other forms of the circuits described above will be obvious to those skilled in the art.

What is claimed is:

1. Capacitance type fluid measuring apparatus for producing a voltage proportional to the weight of dielectric fluid in a tank when, for the range of fluids of interest, the excess of the dielectric constant over the value of unity for air is expressible, within tolerable limits of error, as a prescribed function $f$ of fluid density D, comprising in combination:

at least one measuring condenser having two electrodes which extend into the interior of the tank, said electrodes being so spaced and shaped that the capacitance, when the tank is empty, of that portion of the condenser which is wetted when there is any given volume V of fluid in the tank is a function $g$ of V;

a source of A.C. driving voltage, connected to the measuring condenser to produce a current; and circuit means responsive to said current for producing an A.C. output voltage which is proportional to the excess of said current over the value of current which would flow through the measuring condenser, in response to the driving voltage, if said condenser were dry; said source of A.C. driving voltage comprising:

(I) A fixed voltage source, and
(II) Circuit means for producing a voltage linearly proportional to said output voltage throughout the entire range of the weight of fluid in the tank, said proportional voltage being added to said fixed voltage.

2. Capacitance type fluid measuring apparatus as defined in claim 1, wherein said output voltage circuit means includes an operational amplifier, means for applying said measuring condenser current to the input of said amplifier, and means for applying to the input of said operational amplifier a current equal but opposite in phase to the current which would flow through the measuring condenser, in response to said driving voltage, if the measuring condenser were dry, to produce at the output of said amplifier a voltage proportional to the resultant of said measuring condenser current and said equal but opposite current.

3. Capacitance type fluid measuring apparatus as defined in claim 1, wherein said output voltage circuit means includes an operational amplifier, means for applying said measuring condenser current to the input of said amplifier, means connected to the output of said amplifier for producing a current proportional to said measuring condenser current, means for producing a current equal in magnitude to the current which would flow through the measuring condenser, in response to said driving voltage, if the measuring condenser were dry, said equal current being opposite in phase to said proportional current, means for summing said currents, and means for producing an output voltage proportional to the resultant of said summed currents.

4. Capacitance type fluid measuring apparatus as defined in claim 3, wherein said last-named means includes a second operational amplifier, and means for applying said summed currents to the input of said second amplifier.

5. Capacitance type fluid measuring apparatus as defined in claim 3 including at least two measuring condensers, a separate output voltage circuit means being provided for each measuring condenser, means for producing a current proportional to the output voltage of each of said circuit means, means for summing said currents, and means for producing a readout voltage proportional to said summed currents.

6. Capacitance type fluid measuring apparatus as defined in claim 1 wherein said circuit means (II) includes a transformer having a primary connected to receive the output voltage, and a secondary in series with said fixed voltage source (I).

7. Capacitance type fluid measuring apparatus as defined in claim 1 wherein said source of driving voltage includes an operational amplifier, a first resistor connected between said fixed voltage source (I) and the input of said amplifier, and a second resistor connected to the input of said amplifier and through which said output voltage is applied to said amplifier input, said driving voltage appearing at the output of said operational amplifier.

8. Capacitance type fluid measuring apparatus as defined in claim 1 wherein said circuit means (II) includes an operational amplifier and a resistor connected to the input of said operational amplifier, means for connecting the output voltage to the input of said operational amplifier via said resistor, and a transformer having a primary connected to receive the output of said amplifier, and a secondary in series with said fixed voltage source (I).

9. Capacitance type fluid measuring apparatus as defined in claim 1 wherein said output voltage circuit means includes an operational amplifier, means for applying said measuring condenser current to the input of said amplifier, a zeroing condenser having a capacitance equal to the dry capacitance of the measuring condenser, means for applying to the zeroing condenser a second driving voltage equal and opposite to said driving voltage, and means for feeding the current through said zeroing condenser to the input of said operational amplifier.

10. Capacitance type fluid measuring apparatus as defined in claim 9 wherein said circuit means (II) includes a transformer having a primary connected to receive the output voltage, and a secondary in series with said fixed voltage source (I), and including a second A.C. source for said second driving voltage, said second source comprising a second fixed voltage source, and another secondary of said transformer in series with said second fixed voltage source.

11. Capacitance type fluid measuring apparatus as defined in claim 9 wherein said circuit means (II) includes a transformer having a primary connected to receive the output voltage, and a secondary in series with said fixed voltage source (I), and including a second transformer having a primary shunted across said fixed voltage source (I) and said secondary, and said second transformer having a secondary serving as the source for said second driving voltage.

12. Capacitance type fluid measuring apparatus as defined in claim 9 wherein said circuit means (II) includes a transformer having a primary connected to receive the output voltage, and a secondary in series with said fixed voltage source (I), and including a second A.C. source for said second driving voltage, said second source comprising a second fixed voltage source, and a second transformer, the primary of said second transformer being shunted across said first-mentioned secondary, and the secondary of said second transformer being in series with said second fixed voltage source.

13. Capacitance type fluid measuring apparatus as defined in claim 1 including at least two measuring condensers, and a separate circuit means (II) for each measuring condenser, each circuit means (II) including a transformer having a primary connected to receive its respective output voltage, and a secondary connected between said fixed voltage source (I) and its respective measuring condenser.

14. Capacitance type fluid measuring apparatus as defined in claim 13 wherein each of said transformers has a plurality of secondaries, there being at least as many secondaries as there are measuring condensers, one secondary in each transformer of each of said transformers being connected in series with each other, each group of series-connected resistors being connected between said fixed voltage source (I) and one of the measuring condensers.

15. Capacitance type fluid measuring apparatus as defined in claim 13 wherein each of said transformers has a number of secondaries greater than the number of measuring condensers, one secondary of each of said transformers being connected in series with each other to produce a readout voltage proportional to the weight of fluid in the container.

References Cited

UNITED STATES PATENTS

| | | | |
|---|---|---|---|
| 3,079,797 | 3/1963 | Hermanson | 73—304 C |
| 2,981,105 | 4/1961 | Ryder | 73—304 C |
| 2,908,166 | 10/1959 | Johnson | 73—304 C |
| 3,295,372 | 1/1967 | Gronner | 73—304 C |

LOUIS R. PRINCE, Primary Examiner

F. SHOON, Assistant Examiner